United States Patent
Wu et al.

(10) Patent No.: US 10,645,065 B2
(45) Date of Patent: May 5, 2020

(54) PROXY-BASED DATABASE ENCRYPTION

(71) Applicants:AT&T Intellectual Property I, L.P., Atlanta, GA (US); AT&T Mobility II LLC, Atlanta, GA (US)

(72) Inventors: Xidong Wu, San Ramon, CA (US); Zhengye Liu, Pleasanton, CA (US); Mario Kosseifi, Roswell, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 210 days.

(21) Appl. No.: 15/445,452

(22) Filed: Feb. 28, 2017

(65) Prior Publication Data
US 2018/0248848 A1    Aug. 30, 2018

(51) Int. Cl.
*H04L 29/08*        (2006.01)
*H04L 29/06*        (2006.01)

(52) U.S. Cl.
CPC ........ *H04L 63/0281* (2013.01); *H04L 63/166* (2013.01)

(58) Field of Classification Search
CPC ..... H04L 63/028; H04L 63/166; H04L 29/06; H04L 2209/76; H04L 69/08; H04L 67/28;
(Continued)

(56) References Cited

U.S. PATENT DOCUMENTS 6,587,946 B1    7/2003    Jakobsson
7,698,565 B1    4/2010    Bjorn et al.
(Continued)

FOREIGN PATENT DOCUMENTS

EP        2680207        1/2014
WO    WO 2011/097669    8/2011

OTHER PUBLICATIONS

Do et al., "Attribute based Proxy Re-Encryption for Data Confidentiality in Cloud Computing Environments," 2011 First ACIS/JNU International Conference on Computers, Networks, Systems, and Industrial Engineering, May 23-25, 2011, pp. 248-251, IEEE.
(Continued)

*Primary Examiner* — Ashokkumar B Patel
*Assistant Examiner* — William B Jones
(74) *Attorney, Agent, or Firm* — Hartman & Citrin LLC

(57) ABSTRACT

Concepts and technologies disclosed herein are directed to proxy-based database encryption. According to one aspect, a database encryption proxy system can receive, from a database client, input of a Structured Query Language ("SQL") statement and data to create an encrypted database table. At least a portion of the data is marked with an encrypted identifier to identify which data is to be encrypted by the proxy-based database. The database encryption proxy system can generate a random string for the portion of the data that is marked with the encrypted identifier. The database encryption proxy system can convert the SQL statement into a converted SQL statement that includes the random string in place of the portion of the data marked with the encrypted identifier and can send the converted SQL statement to a cloud database service that is configured to create the encrypted database table based upon the converted SQL statement.

14 Claims, 10 Drawing Sheets

(58) Field of Classification Search
CPC ............. H04L 65/601; G06F 2212/163; G06F 2201/80; G06F 17/30917
See application file for complete search history.

(56) References Cited

U.S. PATENT DOCUMENTS

| | | | |
|---|---|---|---|
| 7,865,741 | B1 | 1/2011 | Wood et al. |
| 8,751,788 | B2 | 6/2014 | Leach |
| 2009/0313276 | A1* | 12/2009 | Wataguchi .......... G06F 21/6236 |
| 2010/0077205 | A1* | 3/2010 | Ekstrom ............. H04L 63/0428 |
| | | | 713/153 |
| 2016/0055347 | A1 | 2/2016 | Park et al. |
| 2016/0269371 | A1 | 9/2016 | Coimbatore |
| 2016/0275296 | A1 | 9/2016 | Cabrera et al. |
| 2017/0103227 | A1* | 4/2017 | Kerschbaum ....... G06F 21/6227 |
| 2018/0103009 | A1* | 4/2018 | Eberlein ............... G06F 16/957 |

OTHER PUBLICATIONS

Xu et al., "CL-PRE: a Certificateless Proxy Re-Encryption Scheme for Secure Data Sharing with Public Could," Proceedings of the 7$^{th}$ ACM Symposium on Information, Computer and Communications Security, May 2-4, 2012, ACM.

Joshi et al., "SecureDBaaS Architecture for Encrypted Cloud Database," International Journal of Computer Application (2250-1797), vol. 5, No. 4, Jun. 2015.

Ferretti et al., "Supporting Security and Consistency for Cloud Database," Cyberspace Safety and Security, 4$^{th}$ International Symposium, CSS 2012, Dec. 12-13, 2012, pp. 179-193.

\* cited by examiner

PROXY-BASED DATABASE ENCRYPTION

BACKGROUND

Sensitive data stored in relational databases is often protected with encryption technologies. Typically, database encryption is performed on the database-side or on the user application-side, both of which have pros and cons. Database-side encryption cannot prevent a rogue database administrator ("DBA") from compromising data security. This is particularly true as database solutions move toward a cloud-based service model in which database servers are hosted in large cloud computing networks instead of in the database owner's own network. User application-side encryption places the responsibility of properly utilizing encryption technologies on the database users. Moreover, user application-side encryption only permits data to be decrypted by the data owner and user(s) with whom the data owner shares the encryption key. Data is more secure when user application-side encryption is used.

Although user application-side encryption provides better security over database-side encryption, the extra security benefit provided by user application-side encryption is countered by several problems. One problem is that data encryption and decryption are both computationally intensive. This is particularly problematic for lightweight computing devices, such as smartphones, laptops, and tablets. Another problem is that database users have to learn to encrypt and decrypt data using the appropriate library. This introduces a steep technical learning curve and can be a major obstacle for people who usually run only a few Structured Query Language ("SQL") query commands to access data. Encryption key management also presents a problem for database users. The database owner desires to share his or her data with other people in a secure and easy way. The methodology to do so is not standardized, and thus the data owner must define and design their own encryption key management scheme. This can be difficult, costly, and time-consuming for the database owner. In user application-side encryption schemes, the data is encrypted prior to being stored in the database, and therefore indexing is unavailable for the encrypted data, resulting in serious performance degradation for data access.

SUMMARY

Concepts and technologies disclosed herein are directed to proxy-based-database encryption. According to one aspect of the concepts and technologies disclosed herein, a database encryption proxy system can receive, from a database client, input of a SQL statement and data to create an encrypted database table. At least a portion of the data is marked with an encrypted identifier to identify which data is to be encrypted by the proxy-based database. The database encryption proxy system can generate a random string for the portion of the data that is marked with the encrypted identifier. The database encryption proxy system can convert the SQL statement into a converted SQL statement that includes the random string in place of the portion of the data marked with the encrypted identifier and can send the converted SQL statement to a cloud database service. The cloud database service can be configured to create and save the encrypted database table based upon the converted SQL statement. The database encryption proxy system can store a mapping between the random string and the portion of the data. The database encryption proxy system can send the converted SQL statement to the cloud database service, which creates and saves the encrypted database table.

In some embodiments, the database encryption proxy system can receive a further SQL statement to modify the encrypted database table. The database encryption proxy system can send the further SQL statement to the cloud database service. The cloud database service can modify the encrypted database table in accordance with the further SQL statement. The further SQL statement can cause the cloud database service to add, delete, or otherwise manipulate the encrypted database table. For example, if the further SQL statement includes a statement to add new data to the encrypted database table, the database encryption proxy system can generate a further random string for the new data to be added to the encrypted database table. The database encryption proxy system can convert the further SQL statement into a further converted SQL statement that includes the further random string in place of the new data. The database encryption proxy system can store a further mapping between the further random string and the new data.

In some embodiments, the database encryption proxy system can receive, from the database client, a database query that identifies a specific database record of the encrypted database table to retrieve. The database encryption proxy system can determine an encrypted database record that corresponds to the database query based upon mapping. The database encryption proxy system can query the cloud database service for the encrypted database record. The database encryption proxy system can receive, from the cloud database service, the encrypted database record. The database encryption proxy system can decrypt the encrypted database record and send the decrypted database record to the database client.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
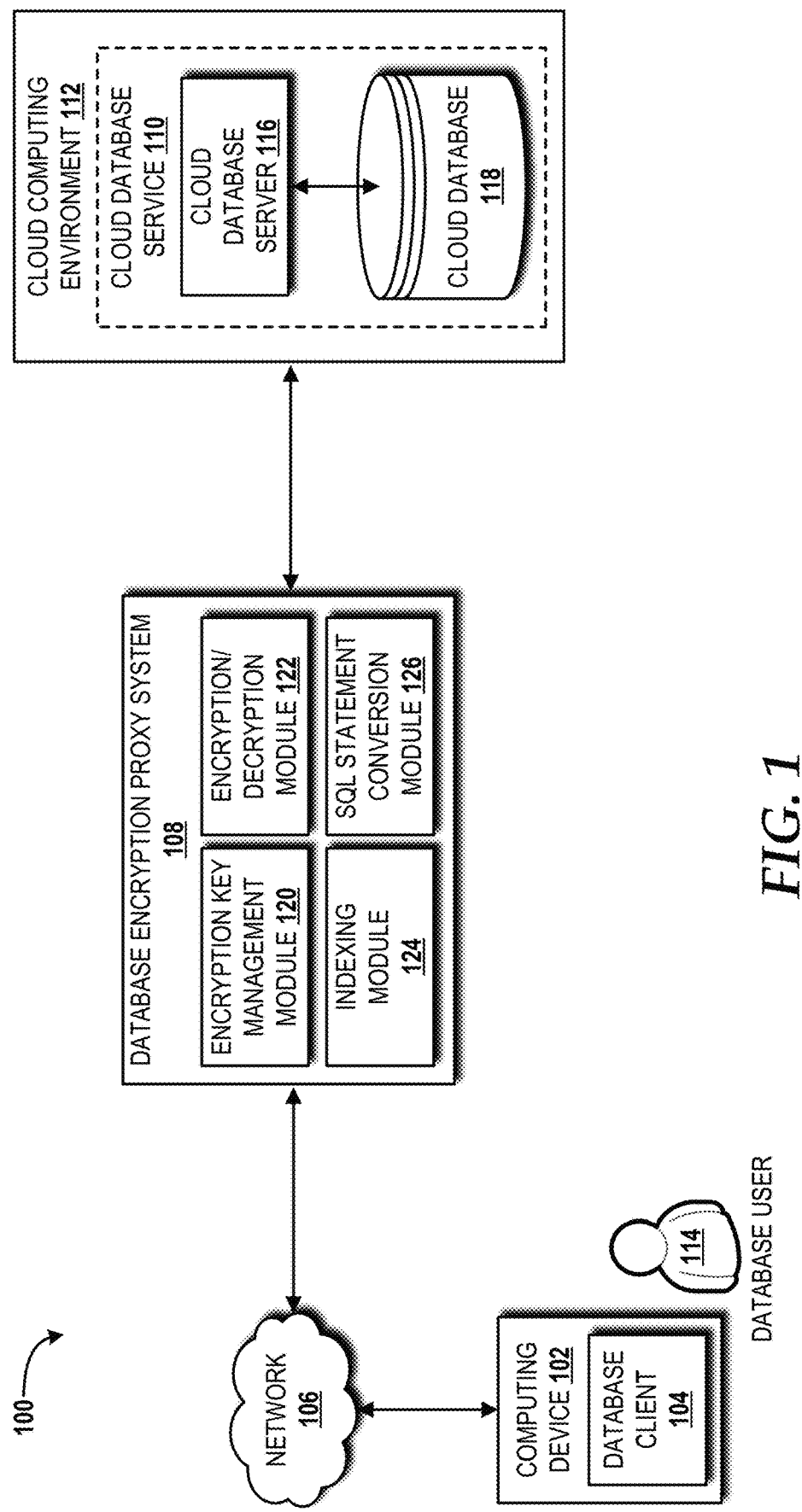
FIG. 1 is a block diagram illustrating an illustrative operating environment capable of implementing aspects of the concepts and technologies disclosed herein.

The concepts and technologies disclosed herein are directed to proxy-based database encryption. According one aspect of the concepts and technologies disclosed herein, a database encryption proxy is inserted between the database user and the database server. This approach can solve the aforementioned problems associated with application-side encryption. Data can be encrypted before being sent to the database; the data owner need not worry that a rogue DBA could compromise data security; database users do not need to learn anything new; and no new database feature is required. Moreover, the database encryption proxy is transparent to the database user and the database server. In some embodiments, the database encryption proxy is owned by the data owner instead of the database DBA or computing infrastructure provider. This is particularly beneficial for cloud-based databases services. The database encryption proxy can be implemented in the data owner's cloud network or a public cloud network.

The disclosed database encryption proxy can manage users, groups, and encryption keys. The database encryption proxy can generate and manage encryption keys. These keys never leave the database encryption proxy, and as such, asymmetric keys are not needed—symmetric keys suffice. The data owner can define one or more data access policies and ownership. Group policies are contemplated.

The disclosed database encryption proxy can encrypt data originating from the data owner based upon requirements specified by the data owner. The database encryption proxy can encrypt all or part of metadata (e.g., table name, column name(s), and the like) and data values for specified database columns. In response to a query from a user, the database encryption proxy can decrypt all data from the database and send to the user the decrypted data as a query result. If the database encryption proxy is hosted in a public cloud the data owner can be responsible for securely sharing the decrypted data between the database encryption proxy and the data owner. Virtual Private Network ("VPN") or other secured channels can be established between the data owner and the database encryption to securely share the decrypted data.

The disclosed database encryption proxy can provide indexing functionality. Typically, if a data column is encrypted, the data column cannot be indexed. In this case, the database encryption proxy can perform indexing for the data column prior to encryption, thereby assigning a unique long integer for each row value in ascending or descending order for the data column that is to be encrypted. The database encryption proxy can store the long integers in the database as an extra column. This column is referred to herein as the "indexing column." When a user queries an indexed data column, the database encryption proxy can translate the query for the data column to the query of the corresponding indexing column, rewrite the query, and send the new, rewritten query to the database. Since the query is to access both the encrypted data column and the indexing column, and the indexing column is indexed by the database, the performance is similar if not the same as if the query is for any indexed data in a traditional indexing scheme.

Indexing is computationally intensive, and indexing by the database encryption proxy remains so. The database encryption proxy has to keep both indexed data columns and indexing data columns either in memory or storage. For this reason, in some embodiments, the indexing function can be executed by one or more servers separate from the server(s) that execute other proxy functions. An open source key-value pair/column NoSQL database, such as HBase, can be used here to query long integers based upon data column value.

The concepts and technologies disclosed herein are particularly suited to transactional databases that typically contain critically important data and Atomicity, Consistency, Isolation, and Durability ("ACID") has to be guaranteed. Following the industry trend, as databases are being moved to cloud infrastructure to save expenses, security becomes a more serious concern since the data is not always in the data owner's possession as it was when the data owner also owned the database server. To secure data with encryption by the data owner themselves (as compared to by a database DBA whom the data owner does not trust), while making the transformation transparent to database users, the cloud-based database encryption proxy disclosed herein can provide a great value for all transactional database users and organizations. Moreover, the disclosed database encryption proxy solves the indexing problem that has been a major performance obstacle for application-side user encryption.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for proxy-based database encryption will be described.

Turning now to FIG. 1, an operating environment 100 in which aspects of the concepts and technologies disclosed herein can be implemented will be described, according to an embodiment. The illustrated operating environment 100 includes a computing device 102 that can execute, via one or more processors (best shown in FIGS. 7 and 8), a database client 104 and can operate in communication with a network 106 through which the database client 104 can communicate with a database encryption proxy system 108 to create, manage, access, and otherwise interact with encrypted database data hosted by a cloud database service 110 in a cloud computing environment 112. The database encryption proxy system 108 is provided between a database user 114 and the cloud database service 110, which includes a cloud database server 116 and a cloud database 118. This approach can solve the above-described problems with application-side data encryption. Data can be encrypted before being sent to the cloud database service 110 for storage in the cloud database 118; the data owner (the database user 114 or other entity) need not worry that a rogue DBA could compromise data security; the database user 114 (and others) does not need to learn anything new; and no new database feature is required. Moreover, the database encryption proxy system 108 is transparent to the database user 114 and the cloud database service 110. In some embodiments, the database encryption proxy system 108 is owned by the data owner instead of the database DBA or computing infrastructure provider, such as a provider of the cloud computing environment 112. The cloud computing environment 112 can be the data owner's cloud network or a public cloud network.

According to various embodiments, the functionality of the computing device 102 may be provided by one or more mobile telephones, smartphones, tablet computers, slate computers, smart watches, smart glasses (e.g., the GOOGLE GLASS family of products), other wearable devices, other smart devices, Internet of Things ("IoT") devices, security devices, media playback devices, televisions, set-top devices, navigation devices, connected cars, laptop computers, notebook computers, ultrabook computers, netbook computers, server computers, computers of other form factors, computing devices of other form factors, other computing systems, other computing devices, and/or the like. It should be understood that the functionality of the computing device 102 can be provided by a single device, by two or more similar devices, and/or by two or more dissimilar devices.

The database client 104 and the cloud database service 110 can utilize one or more relational database management technologies, including open source and proprietary technologies. Some example relational database management technologies include, but are not limited to, MYSQL (available from ORACLE CORPORATION), AMAZON AURORA (available from AMAZON WEB SERVICES, INC.), POSTGRESQL (available from THE POSTGRESQL GLOBAL DEVELOPMENT GROUP), MARIADB (available from MARIADB CORP), ORACLE DATABASE (available from ORACLE CORPORATION), MICROSOFT SQL SERVER (available from MICROSOFT CORP.), and DB2 (available from IBM CORP.). In some embodiments, the cloud database service 110 can instantiate multiple cloud database servers 116 and/or multiple cloud databases 118 that utilize the same or different technologies. In some embodiments, the cloud database service 110 is AMAZON RDS (available from AMAZON WEB SERVICES, INC.), GOOGLE CLOUD SQL (available from GOOGLE INC.), or another distributed database service. Moreover, the cloud database service 110 can communicate with other services (not shown) hosted by the cloud computing environment 112.

The database encryption proxy system 108 can execute, via one or more processors (best shown in FIG. 7), one or more software modules. In the illustrated embodiment, the database encryption proxy system 108 can execute an encryption key management module 120, an encryption/decryption module 122, an indexing module 124, and a SQL statement conversion module 126 to perform operations described in more detail below. It should be understood that although these modules are shown separately, these modules can be combined or built-in to other software capable of being executed by the database encryption proxy system 108. As such, the illustrated embodiment should not be construed as being limiting in any way.

The database encryption proxy system 108 can execute the encryption key management module 120 to generate and manage encryption keys for use by the database encryption proxy system 108. The encryption keys are isolated by the database encryption proxy system 108, and as such, asymmetric keys are not needed—symmetric keys suffice.

The database encryption proxy system 108 can execute the encryption/decryption module 122 to encrypt data originating from the data owner (e.g., from the database user 114 via the computing device 102 executing the database client 104) based upon requirements specified by the data owner. The database encryption proxy system 108 can execute the encryption/decryption module 122 to encrypt all or part of metadata (e.g., table name, column name(s), and the like) and data values for specified database columns. In response to a query from the database user 114, the database encryption proxy system 108 can execute the encryption/decryption module 122 to decrypt all data responsive to the query from the cloud database 118 and send to the database user 114 the decrypted data as a query result. If the database encryption proxy system 108 is hosted in a public cloud, the data owner can be responsible for securely sharing the decrypted data between the database encryption proxy system 108 and the data owner (e.g., by providing secure connections between the illustrated computing device 102, the network 106, and the database encryption proxy system 108). VPN or other secured channels can be established between the data owner and the database encryption proxy system 108 to securely share the decrypted data.

The database encryption proxy system 108 can execute the indexing module 124 to provide indexing functionality. Typically, if a data column is encrypted, the data column cannot be indexed. In this case, the database encryption proxy system 108 can perform indexing for the data column prior to encryption, thereby assigning a unique long integer for each row value in ascending or descending order for the data column that is to be encrypted. The database encryption proxy system 108 can store the long integers in the cloud database 118 as an extra column. This column is referred to herein as the "indexing column." When a user queries an indexed data column, the database encryption proxy system 108 can translate the query for the data column to the query of the corresponding indexing column, rewrite the query, and send the new, rewritten query to the cloud database 118. Since the query is to access both the encrypted data column and the indexing column, and the indexing column is indexed by the cloud database 118, the performance is similar if not the same as if the query is for any indexed data in a traditional indexing scheme.

The SQL statement conversion module 126 can receive SQL statements, from the database client 104 and can convert the SQL statements so as to encrypt at least a portion of the data subject to the SQL statement. Two example SQL statements are illustrated and described herein below with reference to FIGS. 5A and 5B.

Although only one computing device 102, one database client 104, one network 106, one database encryption proxy system 108, the cloud database service 110, the cloud computing environment 112, one database user 114, one cloud database server 116, and one cloud database 118 are shown in the illustrated operating environment 100, multiples of one or more of these elements are contemplated. As such, the illustrated embodiment should not be construed as being limiting in any way.

Figure 2:
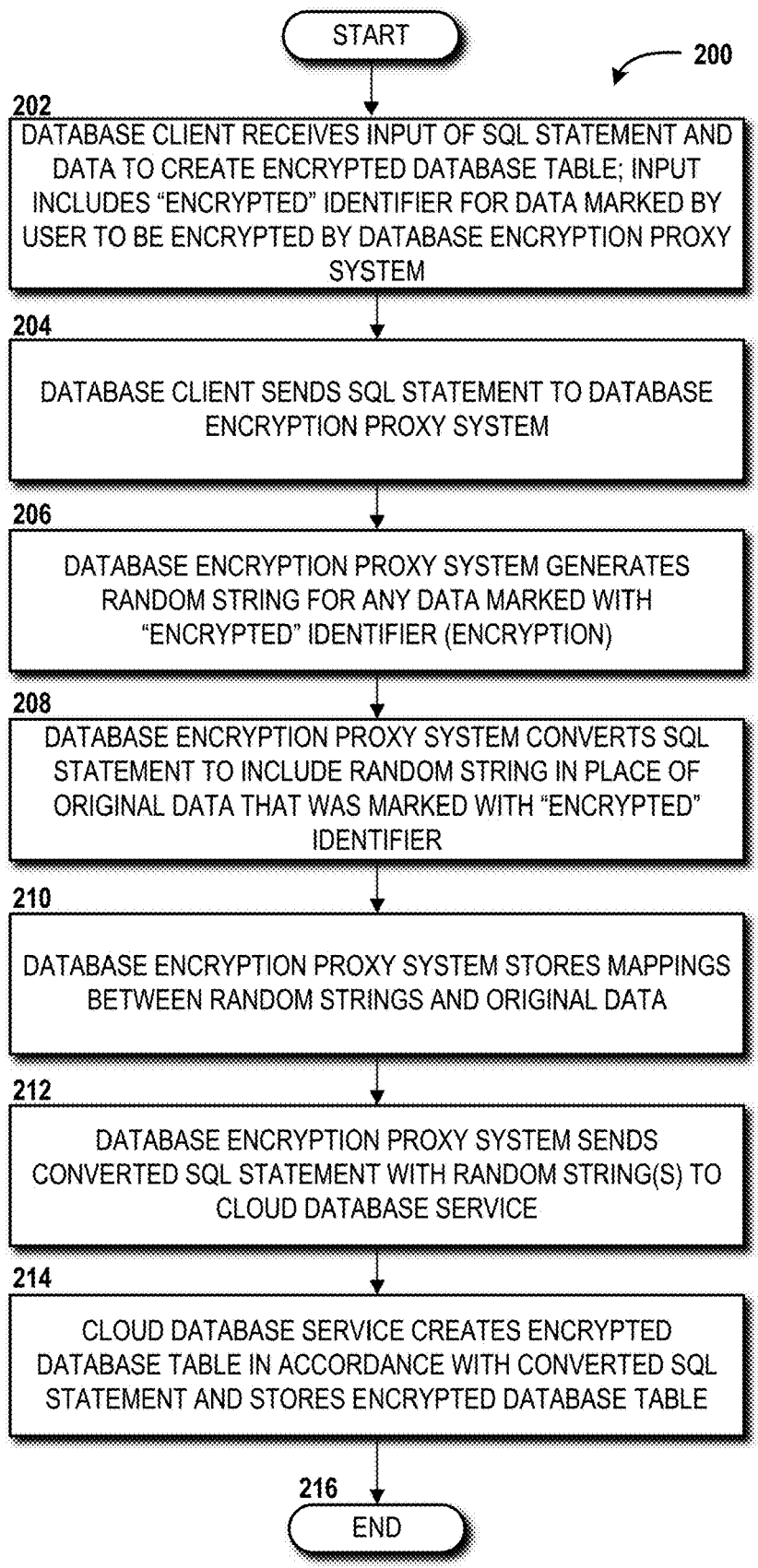
FIG. 2 is a flow diagram illustrating aspects of a method for creating a new encrypted database table, according to an illustrative embodiment.

Turning now to FIG. 2, aspects of a method 200 for creating a new encrypted database table will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 200 is described as being performed, at least in part, by one of the processors via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202, where the database client 104 receives input of a SQL statement and data to create an encrypted database table. The input can be provided by a database owner, such as the database user 114 in this example. The input, in addition to the data for the table, includes an "encrypted" identifier used by the database user 114 to mark at least a portion of the data (or the entirety of the data) to be encrypted by the database encryption proxy system 108. In some embodiments, the "encrypted" identifier can be a keyword, such as the word "encrypted," or another word selected by the database user 114. In other embodiments, the "encrypted" identifier includes one or more characters, one or more numbers, one or more symbols, or any combination thereof. In some embodiments, the SQL statement itself might instruct the database encryption proxy system 108 to encrypt at least some data. For example, syntax for a traditional SQL statement to create a new database table is "CREATE TABLE," whereas syntax for a new SQL statement to create a new encrypted database table can be "CREATE ENCRYPTED TABLE." The "ENCRYPTED" word alternatively can be a keyword as described above that merely modifies the traditional SQL statement to create a new database table. It should be understood that the data can be marked with other identifiers not explicitly disclosed herein. As such, the concept of being marked "encrypted" and the term "encrypted identifier" should not be construed as being limiting to any particular methodology or combination of methodologies.

From operation 202, the method 200 proceeds to operation 204, where the database client 104 sends the SQL statement to the database encryption proxy system 108. From operation 204, the method 200 proceeds to operation 206, where the database encryption proxy system 108 generates a random string for any data marked with the "encrypted" identifier. From operation 206, the method 200 proceeds to operation 208, where the database encryption proxy system 108 converts the SQL statement to include the random string(s) generated at operation 206 in place of the original data that was marked with the "encrypted" identifier. From operation 208, the method 200 proceeds to operation 210, where the database encryption proxy system 108 stores mappings between the random string(s) and the original data.

From operation 210, the method 200 proceeds to operation 212, where the database encryption proxy system 108 sends the converted SQL statement with random string(s) to the cloud database service 110. From operation 212, the method 200 proceeds to operation 214, where the cloud database service 110 creates an encrypted database table in accordance with the converted SQL statement and stores the encrypted database table in the cloud database 118. From operation 214, the method 200 proceeds to operation 216, where the method 200 ends.

Figure 3:
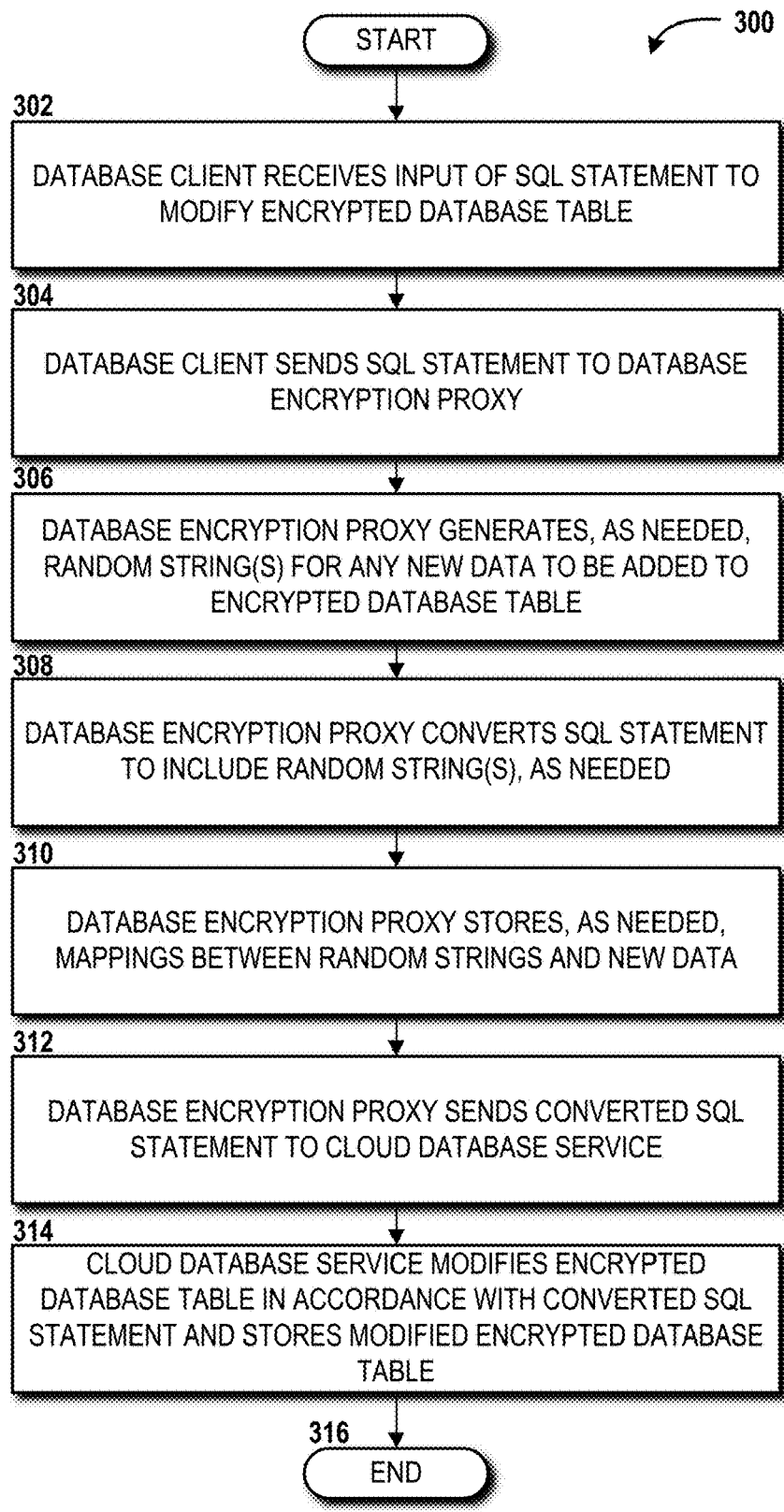
FIG. 3 is a flow diagram illustrating aspects of a method for modifying an existing encrypted database table, according to an illustrative embodiment.

Turning now to FIG. 3, a method 300 for modifying an existing encrypted database table will be described, according to an illustrative embodiment. The method 300 begins and proceeds to operation 302, where the database client 104 receives input of an SQL statement to modify an existing encrypted database table, such as the encrypted database table created in FIG. 2. The SQL statement to modify the existing encrypted database table can add, delete, or manipulate any or all data in the existing encrypted database table. The SQL statement to modify the existing encrypted table can include any known SQL statement capable of modifying an existing database record in a given table. Custom SQL statements also are contemplated.

From operation 302, the method 300 proceeds to operation 304, where the database client 104 sends the SQL statement to the database encryption proxy system 108. From operation 304, the method 300 proceeds to operation 306, where the database encryption proxy system 108 generates, as needed, a random string for any new data to be added to the encrypted database table. From operation 306, the method 300 proceeds to operation 308, where the database encryption proxy system 108 converts the SQL statement to include the random string(s), as needed. From operation 308, the method 300 proceeds to operation 310, where the database encryption proxy system 108 stores, as needed, mapping(s) between the random string(s) and new data. If the SQL statement does not add any new data, the operations 306, 308, 310 can be skipped.

From operation 310, the method 300 proceeds to operation 312, where the database encryption proxy system 108 sends the converted SQL statement (or the SQL statement if no conversion was needed) to the cloud database service 110. From operation 312, the method 300 proceeds to operation 314, where the cloud database service 110 modifies the encrypted database table in accordance with the converted SQL statement (or the SQL statement if no conversion was needed) and stores the modified encrypted database table. From operation 314, the method 300 proceeds to operation 316, wherein the method 300 ends.

Figure 4:
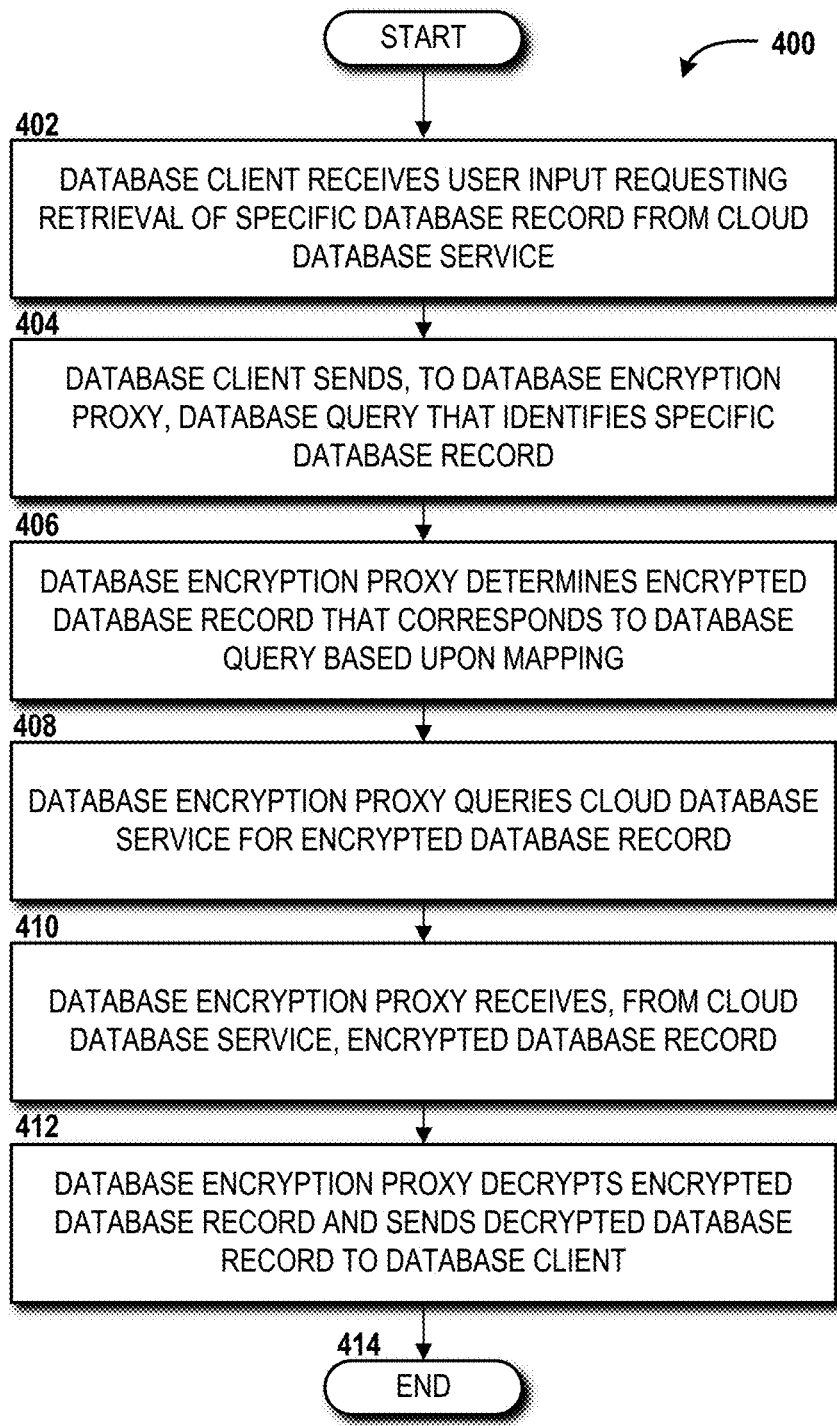
FIG. 4 is a flow diagram illustrating aspects of a method for retrieving a database record, according to an illustrative embodiment.

Turning now to FIG. 4, a method 400 for retrieving a database record will be described, according to an illustrative embodiment. The method 400 begins and proceeds to operation 402, where the database client 104 receives user input requesting retrieval of a specific database record from the cloud database service 110. From operation 402, the method 400 proceeds to operation 404, where the database client 104 sends, to the database encryption proxy system 108, a database query that identifies the specific database record requested at operation 402.

From operation 404, the method 400 proceeds to operation 406, where the database encryption proxy system 108 determines the encrypted database record that corresponds to the database query based upon mapping. From operation 406, the method 400 proceeds to operation 408, where the database encryption proxy system 108 queries the cloud database service 110 for the encrypted database record. From operation 408, the method 400 proceeds to operation 410, where the database encryption proxy system 108 receives, from the cloud database service 110, the encrypted database record.

From operation 410, the method 400 proceeds to operation 412, where the database encryption proxy system 108 decrypts the encrypted database record and sends the decrypted database record to the database client 104. As noted above, the decrypted database record can be protected via a secure connection between the computing device 102 and the database encryption proxy system 108 over the network 106, with one such implementation using a VPN. From operation 412, the method 400 proceeds to operation 414, where the method 400 ends.

Figure 5A:
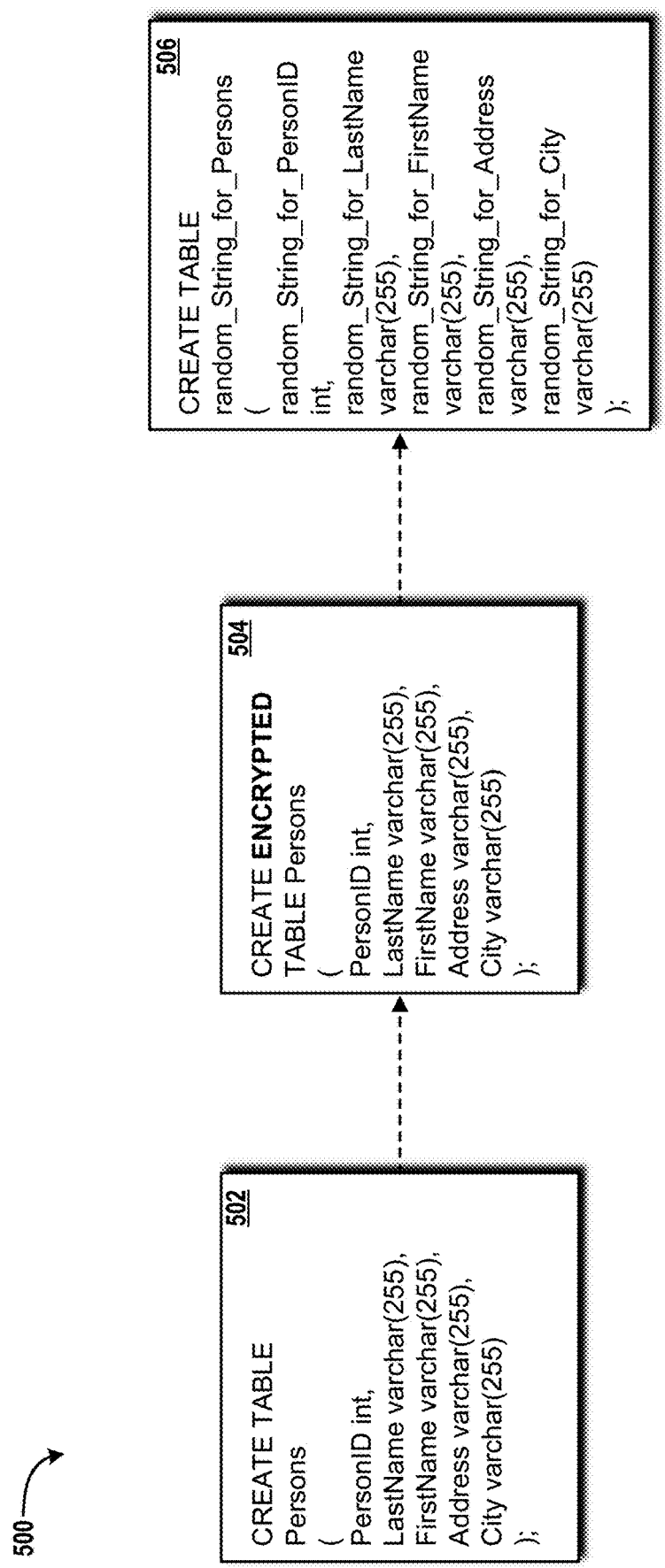
FIG. 5A is a block diagram illustrating example SQL statement flow for creating a new encrypted database table, according to an illustrative embodiment.

Turning now to FIG. 5A, example SQL statement flow 500 for creating a new encrypted database table in accordance with the concepts and technologies disclosed herein will be described. The example SQL statement flow 500 includes a normal SQL table 502 named "Persons" and includes data fields corresponding to identification ("PersonID"), last name ("LastName"), first name ("FirstName"), address ("Address"), and city ("City") data. In this example, the database user 114 desires to protect the entire table, and as such, adds an "encrypted" identifier ("ENCRYPTED") to mark the table as to be encrypted by the database encryption proxy system 108 (shown at 504). The database encryption proxy system 108 generates random strings for the table name "Persons", and for all field names—"PersonID", "LastName", "FirstName", "Address", and "City" (shown at 506). The database encryption proxy system 108 stores the mappings between the random strings and the real table name or field name as the case may be. The database encryption proxy system 108 then sends a SQL statement to the cloud database service 110 to create the encrypted database table in accordance with the SQL statement.

When the database user 114 inserts a new database record into an existing encrypted database table, the database encryption proxy system 108 encrypts all data for the new database record and inserts the encrypted data into the existing encrypted database table in the cloud database 118. When the database user 114 retrieves a database record, such as in the method 400 described in FIG. 4, the database encryption proxy system 108 retrieves the database record from the existing encrypted table stored in the cloud database 118, decrypts the database records, and then sends the result to the database client 104.

Figure 5B:
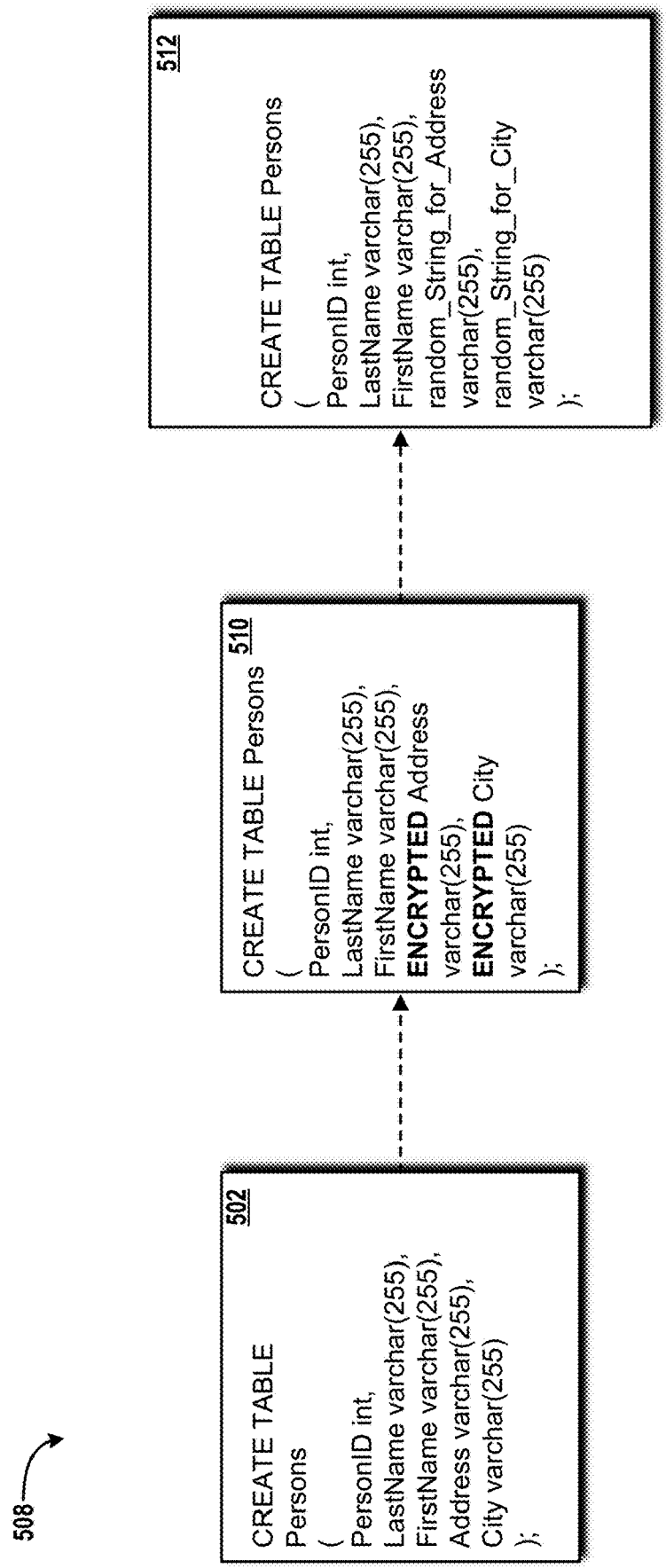
FIG. 5B is a block diagram illustrating example SQL statement flow for creating a new encrypted database field, according to an illustrative embodiment.

Turning now to FIG. 5B, example SQL statement flow 508 for creating a new encrypted database field in according with the concepts and technologies disclosed herein will be described. The example SQL statement flow 508 includes the normal SQL table 502 named "Persons" and includes data fields corresponding to identification ("PersonID"), last name ("LastName"), first name ("FirstName"), address ("Address"), and city ("City") data. In this example, the database user 114 desires to protect the certain database fields and not the entire table, and as such, adds an "encrypted" identifier ("ENCRYPTED") to mark certain database fields, including the "Address" and "City" fields. The database encryption proxy system 108 generates random strings for the field names "Address" and "City" (shown at 512). The database encryption proxy system 108 stores the mappings between the random strings and the real field names. The database encryption proxy system 108 then sends a SQL statement to the cloud database service 110 to create the table including the encrypted fields for "Address" and "City."

Figure 6:
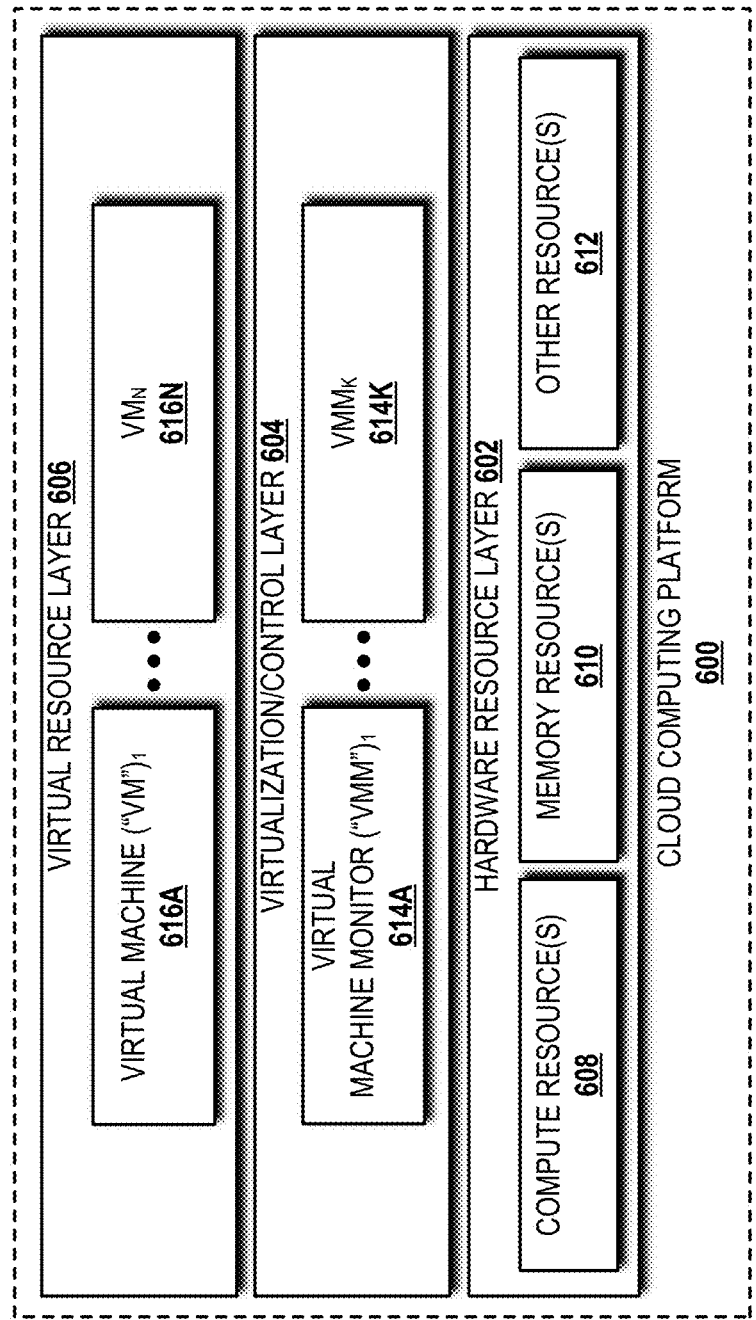
FIG. 6 is a block diagram illustrating an example cloud computing platform and components thereof capable of implementing aspects of the embodiments presented herein.

Turning now to FIG. 6, a cloud computing platform 600 will be described, according to an exemplary embodiment. The architecture of the cloud computing platform 600 can be utilized to implement various elements disclosed herein, including, for example, the cloud computing environment 112. The cloud computing platform 600 is a shared infrastructure that can support one or more services, such as the cloud database service 110. The illustrated cloud computing platform 600 includes a hardware resource layer 602, a virtualization/control layer 604, and a virtual resource layer 606 that work together to perform operations as will be described in detail herein.

The hardware resource layer 602 provides hardware resources, which, in the illustrated embodiment, include one or more compute resources 608, one or more memory resources 610, and one or more other resources 612. The compute resource(s) 608 can include one or more hardware components that perform computations to process data, and/or to execute computer-executable instructions of one or more application programs, operating systems, and/or other software. The compute resources 608 can include one or more central processing units ("CPUs") configured with one or more processing cores. The compute resources 608 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 608 can include one or more discrete GPUs. In some other embodiments, the compute resources 608 can include CPU and GPU components that are configured in accordance with a co-processing CPU/GPU computing model, wherein the sequential part of an application executes on the CPU and the computationally-intensive part is accelerated by the GPU. The compute resources 608 can include one or more system-on-chip ("SoC") components along with one or more other components, including, for example, one or more of the memory resources 610, and/or one or more of the other resources 612. In some embodiments, the compute resources 608 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 608 can be or can include one or more hardware components architected in accordance with an advanced reduced instruction set computing ("RISC") ("ARM") architecture, available for license from ARM HOLDINGS of Cambridge, United Kingdom. Alternatively, the compute resources 608 can be or can include one or more hardware components architected in accordance with an x86 architecture, such an architecture available from INTEL CORPORATION of Mountain View, Calif., and others. Those skilled in the art will appreciate the implementation of the compute resources 608 can utilize various computation architectures, and as such, the compute resources 608 should not be construed as being limited to any particular computation architecture or combination of computation architectures, including those explicitly disclosed herein.

The memory resource(s) 610 can include one or more hardware components that perform storage operations, including temporary or permanent storage operations. In some embodiments, the memory resource(s) 610 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 608.

The other resource(s) 612 can include any other hardware resources that can be utilized by the compute resources(s) 608 and/or the memory resource(s) 610 to perform operations described herein. The other resource(s) 612 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 602 can be virtualized by one or more virtual machine monitors ("VMMs") 614A-614K (also known as "hypervisors;" hereinafter "VMMs 614") operating within the virtualization/control layer 604 to manage one or more virtual resources that reside in the virtual resource layer 606. The VMMs 614 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 608, the memory resources 610, the other resources 612, or any combination thereof. These abstractions are referred to herein as virtual machines ("VMs"). In the illustrated embodiment, the virtual resource layer 606 includes VMs 616A-616N (hereinafter "VMs 616"). Each of the VMs 616 can execute one or more applications to perform operations described herein. In the embodiment illustrated in FIG. 1, the cloud database server 116 and the cloud database 118 can be executed by one or more VMs 616 to provide the cloud database service 110.

Figure 7:
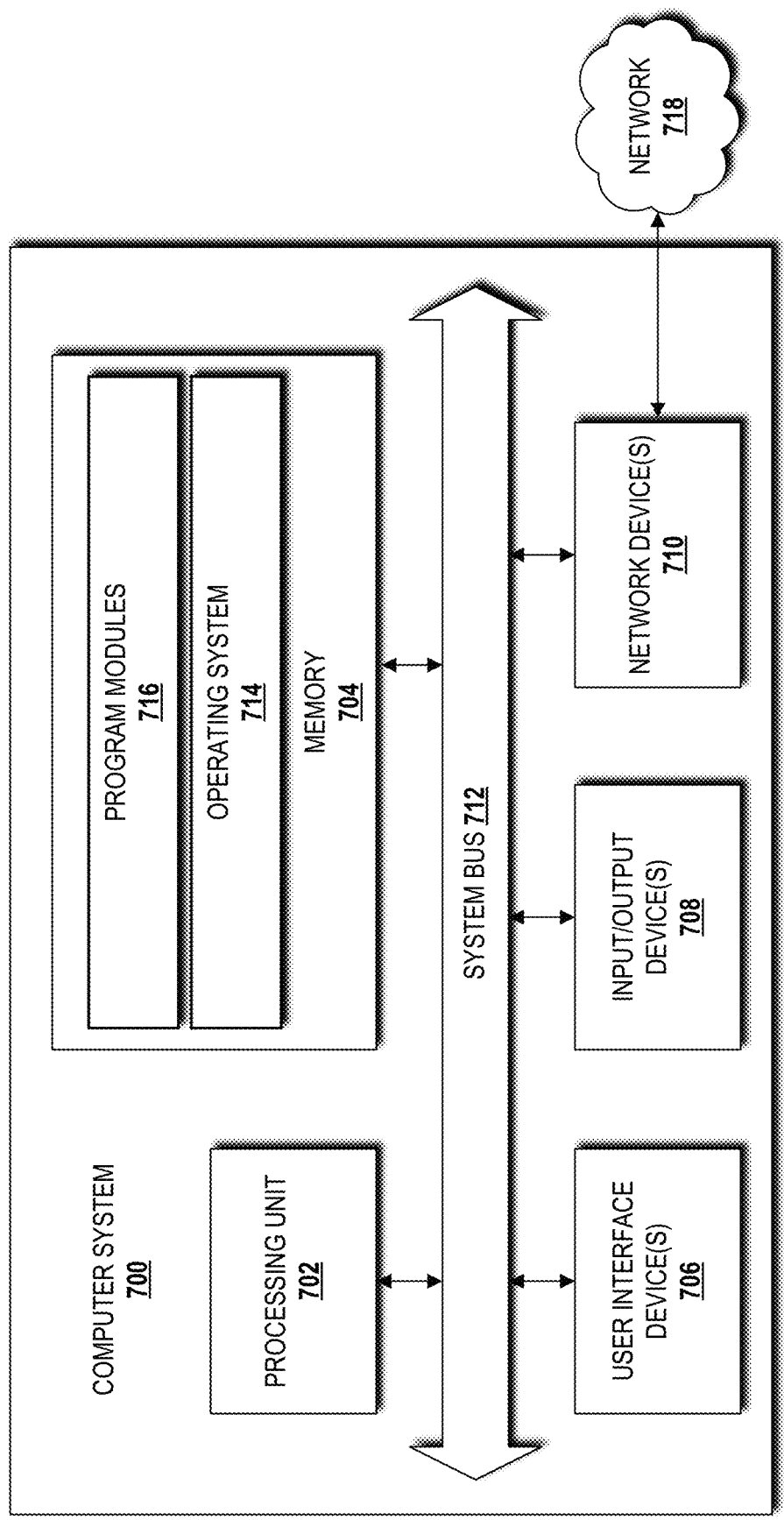
FIG. 7 is a block diagram illustrating an example computer system and components thereof capable of implementing aspects of the embodiments presented herein.

Turning now to FIG. 7 is a block diagram illustrating a computer system 700 configured to provide the functionality in accordance with various embodiments of the concepts and technologies disclosed herein. The systems, devices, and other components disclosed herein can utilize, at least in part, an architecture that is the same as or at least similar to the architecture of the computer system 700. For example, the computing device 102 and/or the database encryption proxy system 108 can utilize, at least in part, an architecture that is the same as or at least similar to the architecture of the computer system 700. It should be understood, however, that modification to the architecture may be made to facilitate certain interactions among elements described herein.

The computer system 700 includes a processing unit 702, a memory 704, one or more user interface devices 706, one or more I/O devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistant ("PDAs"), cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via a network 718. Examples of the network devices 710 include, but are not limited to, a modem, a radio frequency ("RF") or infrared ("IR") transceiver, a telephonic interface, a bridge, a router, or a network card. The network 718 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 718 may be or may include a wired network such as, but not limited to, a Wide Area Network ("WAN"), a wired Personal Area Network ("PAN"), or a wired Metropolitan Area Network ("MAN"). The network 718 can be or can include the network 106 (see FIG. 1), or any other network or combination of networks described herein.

Figure 8:
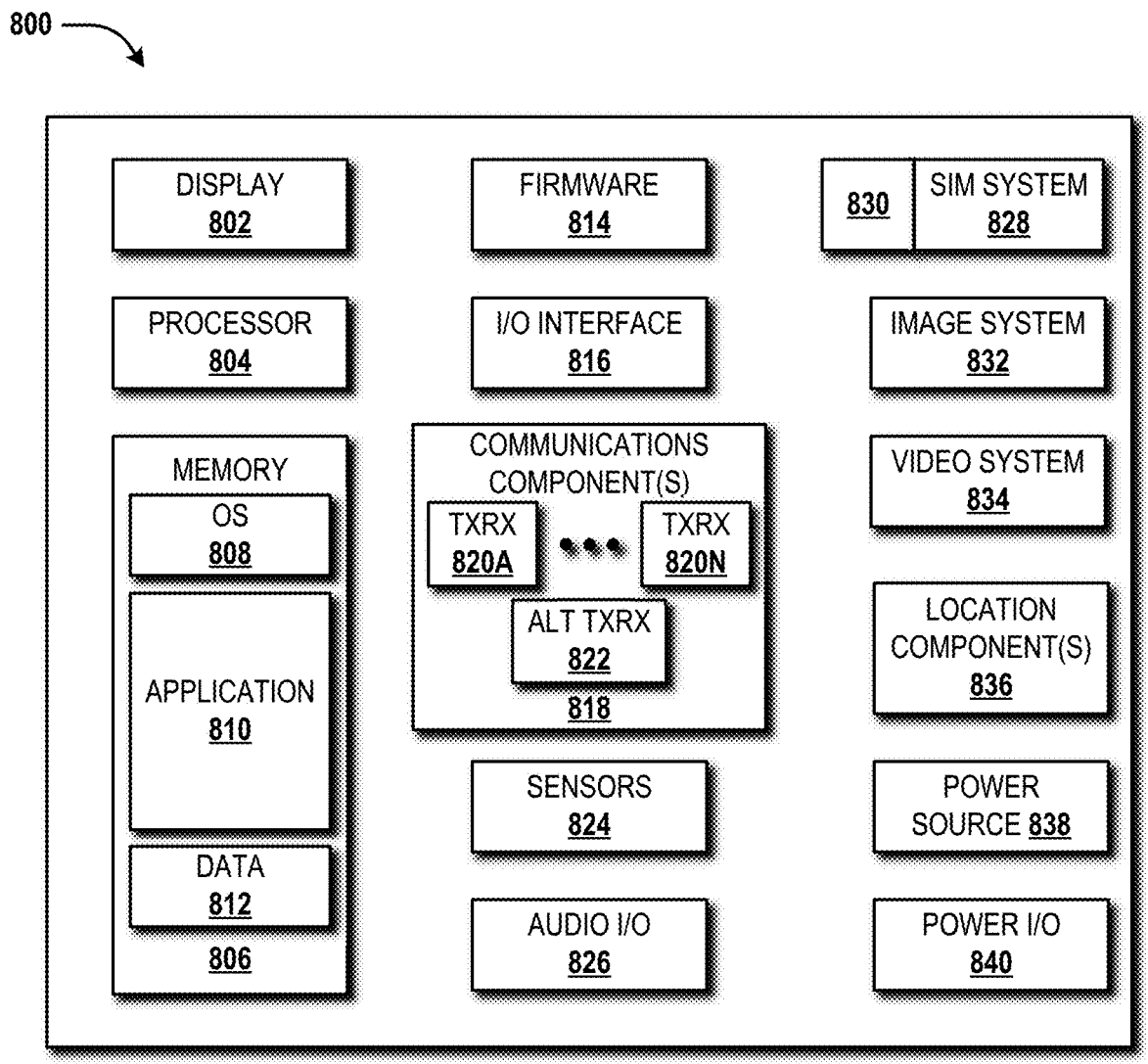
FIG. 8 is a block diagram illustrating an example mobile device and components thereof capable of implementing aspects of the embodiments presented herein.

Turning now to FIG. 8, an illustrative mobile device 800 and components thereof will be described. In some embodiments, the computing device 102 can be configured like the mobile device 800. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the database client 104, other computer-executable instructions stored in a memory 806, or the like. In some embodiments, the applications 810 also can include a user interface ("UI") application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. According to various embodiments, the applications 810 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as database data, location information, user information, organization information, presence status information, user IDs, passwords, and application initiation (start-up) requests. In some embodiments, the I/O interface 816 can include a hardwire connection such as universal serial bus ("USB") port, a mini-USB port, a micro-USB port, an audio jack, a PS2 port, an Institute of Electrical and Electronics Engineers ("IEEE") 1394 ("FIREWIRE") port, a serial port, a parallel port, an Ethernet (RJ48) port, an RJ10 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMA ONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 818 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted GPS ("A-GPS") devices, WI-FI/ WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/ or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
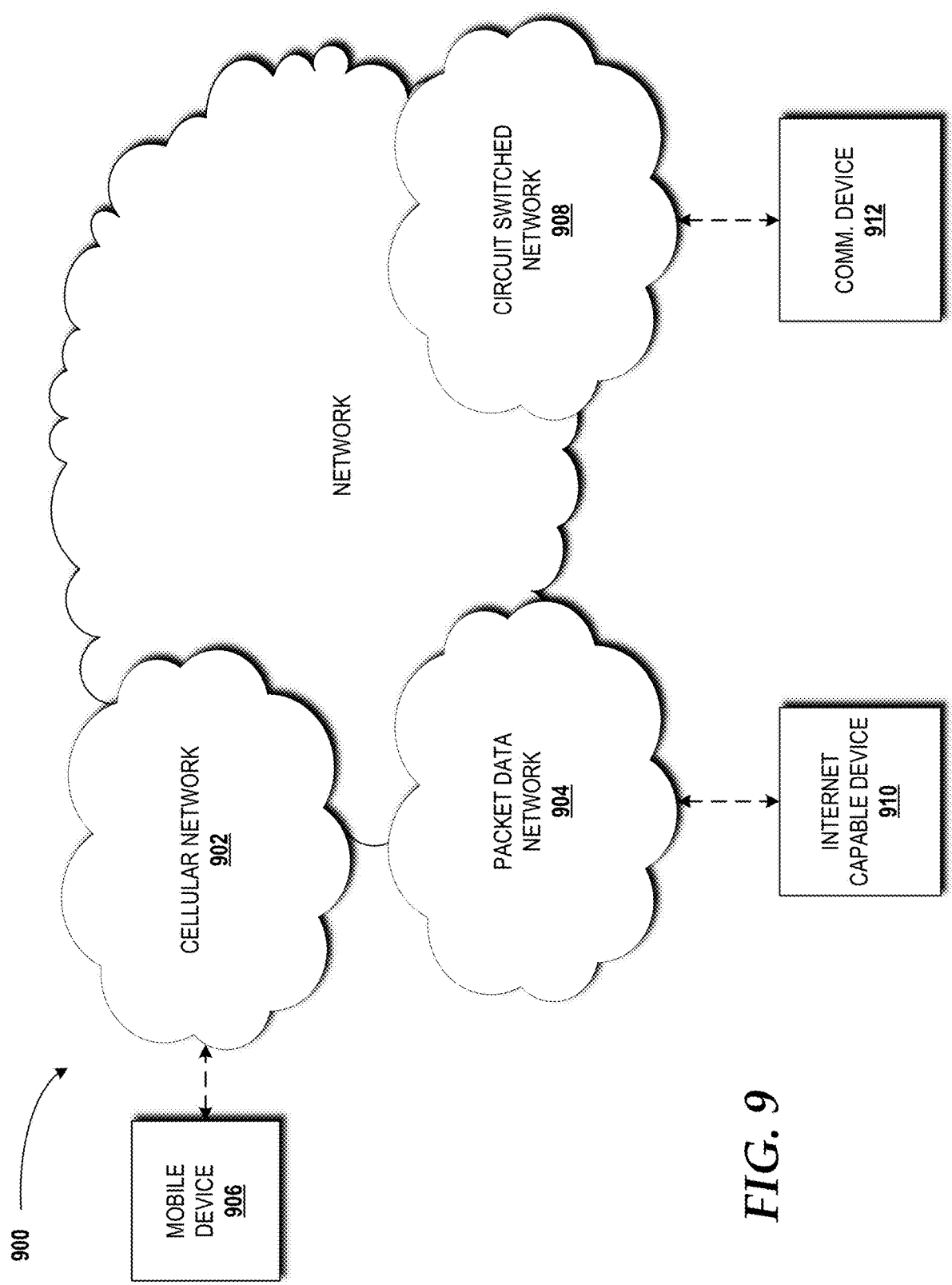
FIG. 9 is a block diagram illustrating an example network capable of implementing aspects of the embodiments presented herein.

Turning now to FIG. 9, details of a network 900 are illustrated, according to an illustrative embodiment. The network 900 includes a cellular network 902, a packet data network 904, and a circuit switched network 908, for example, a publicly switched telephone network ("PSTN"). In some embodiments, the network 106 introduced above in FIG. 1 can be configure the same as or like the network 900.

The cellular network 902 includes various components such as, but not limited to, base transceiver stations ("BTSs"), nodeBs ("NBs"), eNBs, base station controllers ("BSCs"), radio network controllers ("RNCs"), mobile switching centers ("MSCs"), MMES, SGWs, PGWs, short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 908.

A mobile communications device 906, such as, for example, the computing device 102, a cellular telephone, a user equipment, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards as well as evolved and future mobile standards.

The packet data network 904 includes various devices, for example, servers, computers, databases, and other devices in communication with another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 908 includes various hardware and software for providing circuit switched communications. The circuit switched network 908 may include, or may be, what is often referred to as a plain old telephone system ("POTS"). The functionality of a circuit switched network 908 or other circuit-switched network are generally known and will not be described herein in detail.

The illustrated cellular network 902 is shown in communication with the packet data network 904 and a circuit switched network 908, though it should be appreciated that this is not necessarily the case. One or more Internet-capable devices 910, for example, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 908, the cellular network 902, and/or via other networks (not illustrated).

As illustrated, a communications device 912, for example, a telephone, facsimile machine, modem, computer, or the like, can be in communication with the circuit switched network 908, and therethrough to the packet data network 904 and/or the cellular network 902. It should be appreciated that the communications device 912 can be an Internet-capable device, and can be substantially similar to the Internet-capable device 910. In the specification, the network 900 is used to refer broadly to any combination of the networks 902, 904, 908. It should be appreciated that substantially all of the functionality described with reference to the network 900 can be performed by the cellular network 902, the packet data network 904, and/or the circuit switched network 908, alone or in combination with other networks, network elements, and the like.

Based on the foregoing, it should be appreciated that concepts and technologies directed to proxy-based-database encryption have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A database encryption proxy system comprising:
   a processor; and
   a memory comprising instructions that, when executed by the processor, cause the processor to perform operations comprising
      receiving, from a database client, a SQL statement and data to create an encrypted database table, wherein a data element of the data is marked with an encrypted identifier,
      generating a random string for the data element of the data that is marked with the encrypted identifier,
      converting the SQL statement into a converted SQL statement comprising the random string in place of the data element of the data marked with the encrypted identifier,
      sending the converted SQL statement comprising the random string to a cloud database service that creates and stores the encrypted database table based upon the converted SQL statement,
      receiving a further SQL statement to add a new data element to the encrypted database table,
      generating a new random string for the new data element to be added to the encrypted database table,
      converting the further SQL statement to include the new random string in place of the new data element, thereby creating a further converted SQL statement comprising the new random string in place of the new data element, and
      sending the further SQL statement comprising the new random string to the cloud database service that modifies the encrypted database table in accordance with the further SQL statement.

2. The database encryption proxy system of claim 1, wherein the operations further comprise storing a mapping between the random string and the data element of the data.

3. The database encryption proxy system of claim 2, wherein the operations further comprise:
   storing a further mapping between the further random string and the new data element.

4. The database encryption proxy system of claim 2, wherein the operations further comprise:
   receiving, from the database client, a database query that identifies a specific database record to retrieve from the encrypted database table;
   determining an encrypted database record that corresponds to the database query based upon the mapping;
   querying the cloud database service for the encrypted database record;
   receiving, from the cloud database service, the encrypted database record;
   decrypting the encrypted database record to create a decrypted database record; and
   sending the decrypted database record to the database client.

5. The database encryption proxy system of claim 1, wherein the encrypted identifier comprises a keyword.

6. A computer-readable storage medium comprising computer-executable instructions that, when executed by a processor, cause the processor to perform operations comprising:
   receiving, from a database client, a SQL statement and data to create an encrypted database table, wherein a data element of the data is marked with an encrypted identifier;
   generating a random string for the data element of the data that is marked with the encrypted identifier;
   converting the SQL statement into a converted SQL statement comprising the random string in place of the data element of the data marked with the encrypted identifier;
   the converted SQL statement comprising the random string to a cloud database service that creates and stores the encrypted database table based upon the converted SQL statement;
   receiving a further SQL statement to add a new data element to the encrypted database table;
   generating a new random string for the new data element to be added to the encrypted database table;
   converting the further SQL statement to include the new random string in place of the new data element, thereby creating a further converted SQL statement comprising the new random string in place of the new data element; and
   sending the further SQL statement comprising the new random string to the cloud database service that modifies the encrypted database table in accordance with the further SQL statement.

7. The computer-readable storage medium of claim 6, wherein the operations further comprise storing a mapping between the random string and the data element of the data.

8. The computer-readable storage medium of claim 7, wherein the operations further comprise:

storing a further mapping between the further random string and the new data element.

9. The computer-readable storage medium of claim 7, wherein the operations further comprise:
receiving, from the database client, a database query that identifies a specific database record to retrieve from the encrypted database table;
determining an encrypted database record that corresponds to the database query based upon the mapping;
querying the cloud database service for the encrypted database record;
receiving, from the cloud database service, the encrypted database record;
decrypting the encrypted database record to create a decrypted database record; and
sending the decrypted database record to the database client.

10. A method comprising:
receiving, by a database encryption proxy system, from a database client, a SQL statement and data to create an encrypted database table, wherein a data element of the data is marked with an encrypted identifier;
generating, by the database encryption proxy system, a random string for the data element of the data that is marked with the encrypted identifier;
converting, by the database encryption proxy system, the SQL statement into a converted SQL statement comprising the random string in place of the data element of the data marked with the encrypted identifier;
sending, by the database encryption proxy system, the converted SQL statement comprising the random string to a cloud database service that creates and stores the encrypted database table based upon the converted SQL statement;
receiving, by the database encryption proxy system, a further SQL statement to add a new data element to the encrypted database table;
generating, by the database encryption proxy system, a new random string for the new data element to be added to the encrypted database table;
converting, by the database encryption proxy system, the further SQL statement to include the new random string in place of the new data element, thereby creating a further converted SQL statement comprising the new random string in place of the new data element; and
sending, by the database encryption proxy system, the further SQL statement comprising the new random string to the cloud database service that modifies the encrypted database table in accordance with the further SQL statement.

11. The method of claim 10, comprising storing, by the database encryption proxy system, a mapping between the random string and the data element of the data.

12. The method of claim 11, further comprising
storing, by the database encryption proxy system, a further mapping between the further random string and the new data element.

13. The method of claim 11, further comprising:
receiving, by the database encryption proxy system, from the database client, a database query that identifies a specific database record to retrieve from the encrypted database table;
determining, by the database encryption proxy system, an encrypted database record that corresponds to the database query based upon the mapping;
querying, by the database encryption proxy system, the cloud database service for the encrypted database record;
receiving, by the database encryption proxy system, from the cloud database service, the encrypted database record;
decrypting, by the database encryption proxy system, the encrypted database record to create a decrypted database record; and
sending, by the database encryption proxy system, the decrypted database record to the database client.

14. The method of claim 10, wherein the encrypted identifier comprises a keyword.

* * * * *